(No Model.) 2 Sheets—Sheet 1.

C. DOORMANN.
CULTIVATOR.

No. 320,051. Patented June 16, 1885.

Witnesses:

Inventor:
Cuno Doormann,
by Dodge Son,
his Attys.

(No Model.) 2 Sheets—Sheet 2.

C. DOORMANN.
CULTIVATOR.

No. 320,051. Patented June 16, 1885.

UNITED STATES PATENT OFFICE.

CUNO DOORMANN, OF AMITY, IOWA.

CULTIVATOR.

SPECIFICATION forming part of Letters Patent No. 320,051, dated June 16, 1885.

Application filed April 4, 1885. (No model.)

*To all whom it may concern:*

Be it known that I, CUNO DOORMANN, of Amity, in the county of Scott and State of Iowa, have invented certain new and useful Improvements in Cultivators, of which the following is a specification.

My invention relates to cultivators; and it consists in a novel construction and arrangement of parts, whereby the shovels may be adjusted to any desired position, but maintained always with their faces at right angles to the line of travel or advance.

Figure 1:
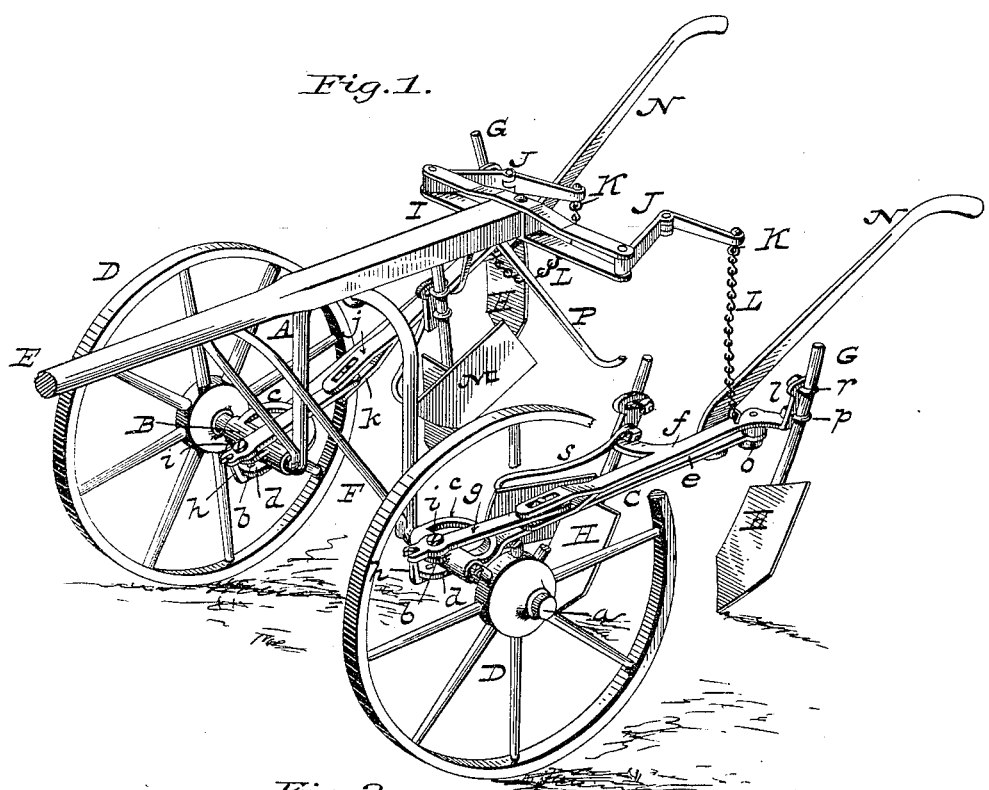
Figure 2:
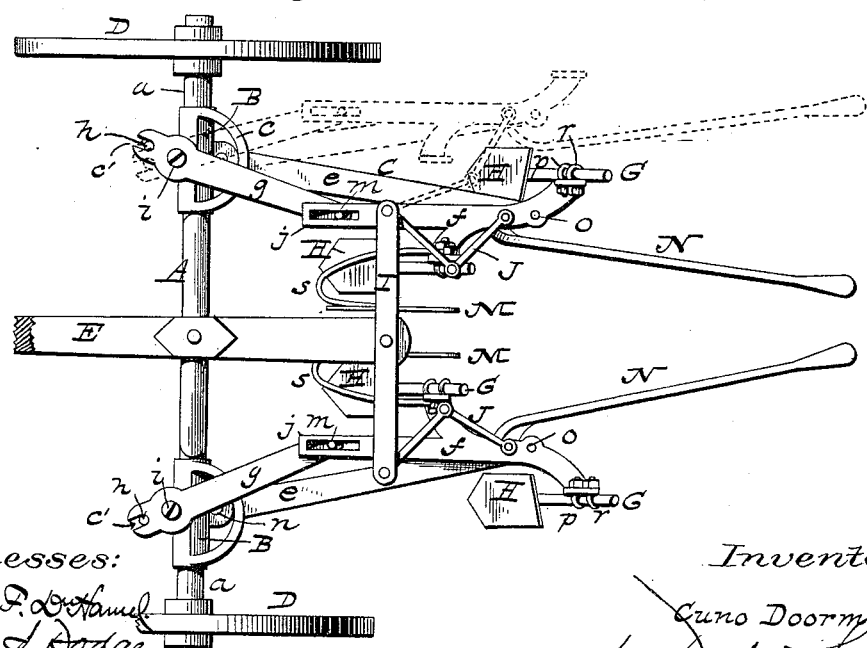
Figure 3:
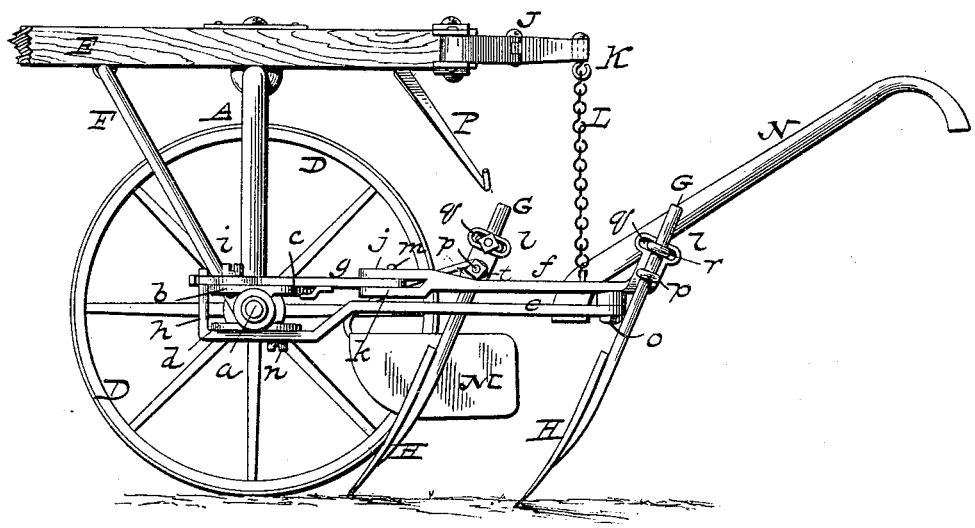

In the annexed drawings, Figure 1 is a perspective view of a cultivator embodying my improvements. Fig. 2 is a top plan view of the same. Fig. 3 is a side elevation with the wheel removed.

A indicates an arched axle with the lateral portions $a$ made cylindrical in cross-section to receive sleeves or boxes B, to which the shovel-beams or drag-bars C are jointed. The axle is furnished with ground-wheels D, and has a tongue, E, secured to its raised or arched portion, and braced by rods F in substantially the ordinary way.

The sleeves or boxes B are preferably made in a single piece or casting, and are each formed with a bearing-plate at the upper side, consisting of a forwardly-projecting lug or ear, $b$, and a rearwardly-extending arc-shaped bar or support, $c$. The under side of each box or sleeve B is formed or provided with a flat plate, $d$, extending forward and backward of the sleeve. These parts are formed for the convenient attachment and for the proper support and guiding of a compound beam or drag-bar, by which the shovels are maintained always at a given angle to the line of draft. Each of said beams consists of three parts—a main bar, $e$, pivoted to the sleeve or box B, a second bar, $f$, pivoted to the rear end of bar $e$, and a lever, $g$, pivoted to the sleeve-box B, and connecting the front ends of the bars $e$ and $f$.

As shown in Fig. 2, the bar $e$ is pivoted to the rear end of lower plate, $d$, of box B, and extends back therefrom a distance about equal to the required length of the beam or drag-bar, and its forward end is carried beyond the front end of plate $d$ and bent upward in the form of a cylindrical stem to a point above the level of the lug or bar $b$, as shown in Figs. 1 and 3. The lever $g$ is pivoted to said lug or bar $b$, and has its forward end extended and provided with a slot, $c'$, to receive the stem $h$ of bar $e$, while the portion in rear of its pivot $i$ is carried back and inserted between the upper and lower plates, $j$ $k$, of the bifurcated front end of bar F, as best shown in Figs. 1 and 3.

The bar $f$ is pivoted near its rear end to the rear end of bar $e$, has its rear bent laterally and then upward to form a support, $l$, for the shovel-standard, and has the plates $j$ $k$ of its front end slotted to receive and permit movement of a pin, $m$, passing vertically through said plates and through the rear end of lever $g$, in which latter it is firmly secured.

A second lateral arm and support, $l$, for a shovel is made at the inner side of bar $f$ about its mid-length.

The pivot $n$ of bar $e$, the pivot $i$ of lever $g$, and the pivot $o$ of bar $f$ may each be formed of bolts, which should be furnished with jam-nuts or locking devices to prevent working loose and dropping out.

The broad bearings afforded by plate $d$ and bar or arc $c$ prevent undue strain upon the pivots $i$ and $n$, and for the same purpose a broad bearing is given around pivot $o$.

Each upright support $l$ is provided with a bolt-hole near its lower end, through which is passed the stem or shank of an eyebolt, $p$, and formed with a slot, $q$, near its upper end, through which is passed a second eyebolt, $r$. These eyebolts are designed to receive and clamp a cylindrical shovel-standard, C, to which any desired form of blade or shovel H will be applied.

The lower eyebolt, $p$, being free to turn in its hole, forms a pivot on which the standard C may be swung to any desired inclination from the vertical, the eyebolt $r$ moving through the slot $q$ during such adjustment, and the two eyebolts serving to clamp the standard firmly at any desired adjustment, either as to inclination or height.

I indicates a cross-frame, which may be of wood or metal, secured to the rear end of tongue E, which extends back in rear of the axle, as shown in the several figures. The cross-frame I projects each side of and at right angles to the tongue, and to its ends are pivoted or hinged jointed arms J, the outer ends of which are furnished with hooks K, upon which are hung chains L. These chains are attached at their lower ends to the bars $f$ of the drag-bars or beams C, and serve to limit the descent thereof, and also to prevent undue strain upon the parts $e f g$ of said drag-bars or upon their pivots and connections.

The length of the chains L may be varied, as desired, by hanging one or another link upon the hooks K.

The jointed arms J and the chains L move with the drag-bars or beams when the latter are adjusted, and thus the chains are caused to hang vertically; hence they exert no tendency to draw or swing the beams to either side.

Fenders M, provided with supporting-rods $s$, are applied to the beams in position to protect the plants from clods or soil thrown inward by the inner shovels, the supporting-rods $s$ being each formed with an eye, $t$, through which the lower eyebolt, $p$, is passed, said bolt serving to clamp and firmly hold the supporting-rod, and consequently the fender, at the required adjustment.

Each drag-bar or beam is furnished with a handle, N, bolted or otherwise secured to the lower bar, $e$, thereof.

The machine being thus constructed, the operation is as follows: Each beam, with its shovels and fender, works independently of the other, but both operate in precisely the same manner. When the beam is brought to a position directly in line with the pivot $n$ of bar $e$, and at right angles to the axle, the three members of the beam fall in line one above another, as shown in Fig. 1. When it is desired to adjust the shovels to one or the other side, the handle N is moved in the required direction, swinging the bar $e$ about its pivot $n$, and causing said bar to assume an oblique position to the line of draft, as shown in Fig. 2. This movement also carries the pivot $o$ and the rear end of bar $f$ to one side with bar $e$. While this action is occurring, the upright stem $h$ at the forward end of bar $e$ moves laterally, and, working in the slot $c$ of lever $g$, moves said lever about its pivot $i$, causing its rear end to swing in the same direction as the bar $e$. Owing, however, to the relative positions of the pivots $c$ and $n$, and to the relative lengths of bar $e$ and lever $g$, each side of their pivots, the rear end of each swings exactly the same distance out of line with pivots $c$ and $n$. The sliding connection between the rear end of lever $g$ and the front end of bar $f$ causes the latter to move in unison and equally with said lever $g$, and thus the front end of bar $f$ is caused to move simultaneously and equally with its rear end; or, in other words, the bar $f$ is moved bodily to one side or the other without inclination or change of position relatively to the line of draft. As a consequence, the shovels maintain always the same angle to the line of advance, and thus the object of the invention is attained.

The parts are simple, strong, and durable, and work freely together.

It is apparent that any other convenient form of sliding connection may be provided for the lever $g$ and the bar $f$, and that in other respects the details may be considerably varied without departing from the spirit of my invention.

Hooks or curved arms P may be attached to the rear extension of the tongue, upon which to hang the beams or drag-bars when not in operation.

Being attached to the bars $f$, the fenders are always at the same angle, whatever may be the adjustment of the beams.

The compound bearings and their suspending devices constitute an attachment for ordinary cultivators already in use, and will be thus put upon the market, as well as in complete machines.

Having thus described my invention, what I claim is—

1. In a cultivator, a compound beam or drag-bar consisting of bars $e$ and $f$ and lever $g$, constructed and arranged substantially as described and shown, whereby the bar $f$ is caused to move laterally without changing its position relative to the line of draft.

2. The combination, with a cultivator-frame, of a box or sleeve swiveled upon the axle thereof, a bar pivoted to said sleeve, provided with an upright stem in advance of its pivot and extending backward therefrom, a second bar pivoted to the first near the rear end of each and provided with shovel-standards, and a lever pivoted to the box or sleeve, and connected at its front and rear ends, respectively, with the upright stem of the first bar and the forward end of the second bar by sliding connections, all substantially as described and shown.

3. The combination, substantially as described and shown, of wheeled axle A, sleeve B, swiveled thereon, bar $e$, pivoted to the sleeve at $n$, bar $f$, pivoted to bar $e$ at $o$, and lever $g$, pivoted to sleeve B at $i$, and having its front end slotted to receive the upturned end of bar $e$ and its rear end connected with the front end of bar $f$ by a sliding joint.

4. In combination with axle A and sleeve B, swiveled thereon, bar $e$, pivoted to said sleeve and having upright end $h$, bar $f$, pivoted to the rear end of bar $e$ and slotted at its front end, and lever $g$, pivoted to sleeve B, slotted at its front end to receive the upright $h$, and provided with guide-pin $i$ at its rear end, working in the slotted end of bar $f$.

5. In a cultivator, the combination of a frame, a laterally-adjustable beam, a jointed hanger for said beam, and a chain extending from the hanger to the beam.

6. In combination with a wheeled frame or sulky, jointed arms J, provided with hooks K, laterally-adjustable beams, and chains L, connecting the beams, and the hooks K, substantially as and for the purpose set forth.

7. The herein-described attachment for cultivator-sulkies, consisting of box or sleeve B and compound beam C, composed of bars $e f$ and lever $g$, said parts being constructed, combined, and arranged to operate substantially as set forth.

8. An attachment for cultivator-sulkies, consisting of box or sleeve B, compound beam C, composed of bars $e\ f$ and lever $g$, jointed arms J, provided with hooks K, and chains L, connecting the hooks and beams, substantially as described and shown.

CUNO DOORMANN.

Witnesses:
JOHN GERDES,
B. FINGER.